US011656035B2

(12) United States Patent
Cave (10) Patent No.: US 11,656,035 B2
(45) Date of Patent: May 23, 2023

(54) HEAT STORING AND HEAT TRANSFER SYSTEMS INCORPORATING A SECONDARY CHAMBER SELECTIVELY MOVEABLE INTO A PRIMARY HEAT STORAGE MEMBER

(71) Applicant: Piers St John Spencer Cave, Woking (GB)

(72) Inventor: Piers St John Spencer Cave, Woking (GB)

( * ) Notice: Subject to any disclaimer, the term of this patent is extended or adjusted under 35 U.S.C. 154(b) by 0 days.

(21) Appl. No.: 16/357,143

(22) Filed: Mar. 18, 2019

(65) Prior Publication Data

US 2019/0219339 A1    Jul. 18, 2019

Related U.S. Application Data

(63) Continuation-in-part of application No. 15/423,984, filed on Feb. 3, 2017, now abandoned, and a continuation-in-part of application No. 15/500,311, filed as application No. PCT/GB2015/000220 on Jul. 28, 2015, now Pat. No. 10,233,784.

(51) Int. Cl.
*F28D 19/04* (2006.01)
*F28D 20/00* (2006.01)
*F28F 13/00* (2006.01)

(52) U.S. Cl.
CPC ......... *F28D 19/047* (2013.01); *F28D 19/048* (2013.01); *F28D 20/0034* (2013.01); *F28D 20/0056* (2013.01); *F28D 2020/0073* (2013.01); *F28D 2020/0078* (2013.01); *F28D 2020/0082* (2013.01); *F28D 2020/0095* (2013.01); *F28F 2013/008* (2013.01); *F28F 2280/10* (2013.01); *Y02E 60/14* (2013.01)

(58) Field of Classification Search
CPC ...... F28D 11/06; F28D 15/0208; F28D 19/04; F28D 2020/0082; F03G 7/04; Y02E 60/14
See application file for complete search history.

(56) References Cited

U.S. PATENT DOCUMENTS 4,713,944 A * 12/1987 Januschkowetz ..... F28D 20/003
                                                          62/480
10,233,784 B2 * 3/2019 Cave ..................... F24D 17/001
(Continued)

FOREIGN PATENT DOCUMENTS

DE   102011102138 A1 * 11/2012  ......... F28D 20/0056
FR     2811744 A1 *  1/2002  ........... F24H 7/0408

*Primary Examiner* — Laert Dounis (57) ABSTRACT

A heat storage and transfer system that incorporates a primary heat storage chamber or body that is thermally insulated and which in use contains a heat storing liquid or solid; and a secondary chamber external to and adjacent the primary heat storage chamber or body through which a liquid, heat transfer fluid or steam to be heated is passed in use, the system having a heat transfer mechanism to selectively transfer thermal energy from the heat storing liquid or solid of the primary heating chamber or body to the liquid or steam to be heated in the secondary chamber. The heat transfer mechanism has a drive that moves the secondary chamber from a first position that is thermally separated from the primary chamber into a second position that is substantially inserted in a void or recess within the primary chamber or body.

18 Claims, 6 Drawing Sheets

(56) References Cited

U.S. PATENT DOCUMENTS

2010/0242474 A1\* 9/2010 Berger .................... F01K 25/10
                                                     60/641.2
2015/0107244 A1\* 4/2015 Lakic ..................... F24T 10/30
                                                     60/641.2

\* cited by examiner

HEAT STORING AND HEAT TRANSFER SYSTEMS INCORPORATING A SECONDARY CHAMBER SELECTIVELY MOVEABLE INTO A PRIMARY HEAT STORAGE MEMBER

CROSS REFERENCE TO RELATED APPLICATIONS

This application is a continuation in part of U.S. patent application Ser. No. 15/500,311, filed on Jan. 30, 2017 and issued as U.S. Pat. No. 10,233,784 on Mar. 19, 2019, and application Ser. No. 15/500,311 was a national stage entry of PCT application no. PCT/GB2015/000220, having an international filing date of Jul. 28, 2015 which claimed the benefit of Gb application no. 1413358.1 filed on Jul. 28, 2014, and this application is a continuation in part of U.S. patent application Ser. No. 15/423,984 filed on Feb. 3, 2017, and currently pending, which claims priority from GB1601976.2 filed on Feb. 3, 2016, and including benefit from the respective priority claims of those applications, and this application claims the benefit of priority to UK patent application GB1819734.3 filed on Dec. 3, 2018; the entirety of all applications cited above are incorporated herein by reference.

BACKGROUND OF THE INVENTION

Field of the Invention

The present invention primarily concerns heat transfer systems and concerns improvements in and relating to heat storing systems for heat storage and transfer for use to provide energy to cooling systems power electricity generation. The present invention also concerns improvements to heat storing systems of liquid-heating appliances, including systems for heating water or other liquids, whether for central heating of buildings or for hot water delivery/dispensing

Background

It is a major objective for all modern energy systems to be able to operate with efficiency and suitably on a low carbon or carbon neutral basis to supply our needs. However, there remain on-going difficulties in managing energy storage and supply. For example, ever-advancing improvements in harvesting solar energy, when it is available, for use for water heating or for electricity generation remain hampered by difficulties in storing the energy for use when it is required. Solar energy harvesting systems for Combined Heat and Power (Solar CHP) in domestic/localized use commonly store the harvested energy from the solar hot water arrays in a hot water storage tank and, with limited electrical storage capacity. The heat energy stored in the hot water tanks is lost relatively rapidly if not used swiftly and is also not an effective means for storing energy for generation of electricity when required.

Liquid heating appliances for heating water are for the most part generally not pressurised systems, but are designed to operate at atmospheric pressure or at relatively low pressures of a few bar. Some are operated to heat water to boiling point of 100° C. at atmospheric pressure so that part of the water is converted to steam. The most versatile water heaters are generally electrical water heaters. Electrical water heaters for central heating of buildings or for hot tap-water or drinks water supply are commonly of a type comprising a main heating chamber for the liquid to be heated and which incorporates within it a high electrical resistance immersion heating conducts heat directly to the surrounding water in the chamber. On the whole electrical water heaters are relatively expensive and their thermal losses in operation are quite considerable and they do not represent an efficient means for storing or using electrical energy but are used for convenience, compact size and often due to lack of alternatives for a specific location (other fuel sources not available/viable) even though running costs can be high.

Given that we are all to reduce our carbon footprint and all have a strong motive to reduce our energy expenses too in the face of ever-rising cost of fuels for heating, there is a strong need for better water heating options. Electrical water heaters give the greatest flexibility and especially facilitate use of renewable energy, e.g. from electrical energy harvested from PV arrays or wind turbines t cetera, but fail to store or use the energy to best effect.

Although the main focus of current energy policy both nationally and internationally seeks to replace reliance on fossil fuels with renewable energy sources, the UK like most other countries, still needs to continue to run fossil fuel (coal, gas and oil) and biomass steam cycle power stations to meet its high national energy needs. As is widely documented, steam cycle power stations generally operate at relatively low levels of efficiency, commonly of the order of 33% and below 50%. It is thus an object of one aspect of the present invention to substantially improve overall operating efficiency of steam cycle power plants/power stations to improve their economy and improve their carbon footprint in the process.

It is a general object of the present invention to provide an improved heat storage and transfer system for storing thermal energy and releasing it efficiently. The system seeks to overcome problems of existing thermal energy storage and electricity generating systems with a design notably more compact, economical and efficient than the existing thermal energy storing systems.

SUMMARY OF THE INVENTION

According to the first aspect of the present invention the heat storage and transfer system comprises: a primary heat storage chamber or body that is thermally insulated and which in use contains a heat storing liquid or solid; and a secondary chamber external to and adjacent the primary heat storage chamber or body through which a liquid or steam to be heated is passed in use, the system having a heat transfer mechanism to selectively transfer thermal energy from the heat storing liquid or solid of the primary heating chamber or body to the liquid or steam to be heated in the secondary chamber, wherein the heat transfer mechanism comprises a drive that moves the secondary chamber from a first position spaced from the primary chamber and into a second position inserted in a void or recess within the primary chamber or body. This suitably brings a major surface area of the secondary chamber into contact or in intimate proximity with a surface of the primary heating chamber or body within the recess or void thereof for heat transfer.

The primary heat storage chamber or body has or defines a recess or void into which the secondary chamber is able to move for heat transfer. The recess or void is preferably in an external surface of the primary chamber or body. The primary chamber or body thus preferably partly surrounds the secondary chamber when the secondary chamber is in a position for thermal transfer.

The primary chamber or body is preferably a solid body manufactured from a concrete composite, silicon and/or iron. Such material has to exhibit suitably high thermal capacity and thermal conductivity. A plurality of high thermally conductive rods may be arranged throughout the primary chamber or body to enhance heat distribution across the body.

The recess or void is particularly preferably in a top external surface of the primary chamber or body. The secondary chamber is positioned above the surface and arranged to be lowered down into it. The recess or space preferably is of a complementary shape to the corresponding external surface of the secondary chamber whereby there is a mating inter-fit of the secondary chamber in the primary chamber or body.

Preferably the secondary chamber has a convex curved outer surface and the recess or space has a concave surface that accommodates the convex curved outer surface.

The secondary chamber is suitably an elongate conduit and comprises preferably of a coil or matrix of tubing. Preferably the secondary chamber's conduit is defined in a lateral outer surface of a secondary body, suitably as a covered channel. The secondary body is preferably of a cylindrical, conical or frusto-conical overall form and hollow at its core.

The secondary body may be of an elongate overall form, e.g. an elongate cylindrical, conical or frusto-conical overall form having a long axis and suitably the recess is a complementary-shaped elongate trough/groove in the primary chamber or body and the long axis of the secondary chamber form is substantially parallel or oblique to the recess in use. In an alternative variant the secondary body may be of a short cylindrical or frusto-conical overall form, e.g. approximately a ring or disc or tapered rounded plug-like form in overall shape, and the recess is a complementary-shaped recess in the primary chamber or body and whereby the axis of the short substantially cylindrical form of secondary body is substantially parallel to the primary chamber or body.

The secondary chamber/body is preferably positioned within a thermal insulating cover that also houses/encapsulates/encases and thermally insulates the primary chamber or body. The secondary chamber/body is suitably positioned in a pocket/within the thermal insulating cover. The thermal insulating cover of the primary chamber or body comprises of housing or cladding assembled from ceramic tiles, bricks, quilt or foam.

Preferably the system comprises of a movable thermal barrier that is selectively positioned between the secondary chamber and primary chamber to guard against radiated heat losses when the secondary chamber is in the first (i.e. stand-by) position. The thermal barrier is movable to allow the secondary chamber to be exposed to the heat from the primary chamber or body when the secondary chamber/body is in the second (i.e. release) position. The thermal barrier preferably overlies the recess or void of the primary body while the secondary chamber is in the first position and has a drive mechanism to move it aside to allow the secondary chamber/body to move to its second position within the recess/void.

The thermal barrier preferably comprises an iris that dilates open or a plate or a cover that slides laterally aside or revolves away from covering the recess or void to allow the secondary chamber to advance into the recess or void. The secondary chamber is an elongated circular cylindrical tubing coil with the long axis being parallel or oblique to the recess of the thermal barrier, which is preferably an arc of a circular cylindrical form and revolves around the long axis of the secondary chamber.

According to a second aspect of the present invention, the heat storage and transfer system comprises of: a primary heat storage chamber or body that is thermally insulated and which contains or comprises of a heat storing liquid or solid; and a secondary chamber external and adjacent to the primary heat storage chamber or body through which a liquid or steam is passed and heated when in use, the system having a heat transfer feature to selectively transfer thermal energy from the heat storing liquid or solid of the primary heating chamber or body to the liquid or steam to be heated in the secondary chamber. The secondary chamber being thermally coupled in use to features of a steam cycle power plant to heat the feed-water of the power plant prior to the feed-water entering the boiler of the power plant or to scavenge heat from the power plant.

The feed-water in the power-plant is normally unheated water or recycled condensate that is heated in stages and turned to superheated steam in the boiler of the power plant to then ultimately being converted to electrical energy by a steam turbine and a generator. The secondary chamber may be thermally coupled to heat transfer fluid from the boiler, turbine, condenser or the feed-water system of the plant, indeed to any hot feature where thermal energy can be captured, particularly when the system is ramping down and would otherwise be lost. The present invention greatly improves efficiency of operation of the steam cycle power plant by much more efficiently pre-heating the feed-water supply of the power plant.

The present invention can also be utilized as a liquid heating appliance for heating water or other liquids, and may comprise: a primary heat chamber (heat storage chamber) that is thermally insulated and which in use contains a heat storing liquid or solid; and a secondary chamber adjacent to the primary chamber through which a liquid passes and is heated when in use, the appliance having a heat transfer feature to selectively transfer thermal energy from the heat storing liquid or solid of the primary heating chamber to the liquid to be heated in the secondary chamber, wherein the secondary chamber is a conduit through which the liquid to be heated is able to flow. The appliance further has a tertiary chamber adjacent the primary chamber and that is a conduit through which a liquid is able to flow, the secondary and tertiary chambers being configured alternately over the external surface of the primary chamber. Preferably, the secondary and tertiary chambers wind alternately around the exterior of the primary chamber as coils. The secondary and tertiary chambers may collectively wholly surround/ensheathe the primary chamber.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
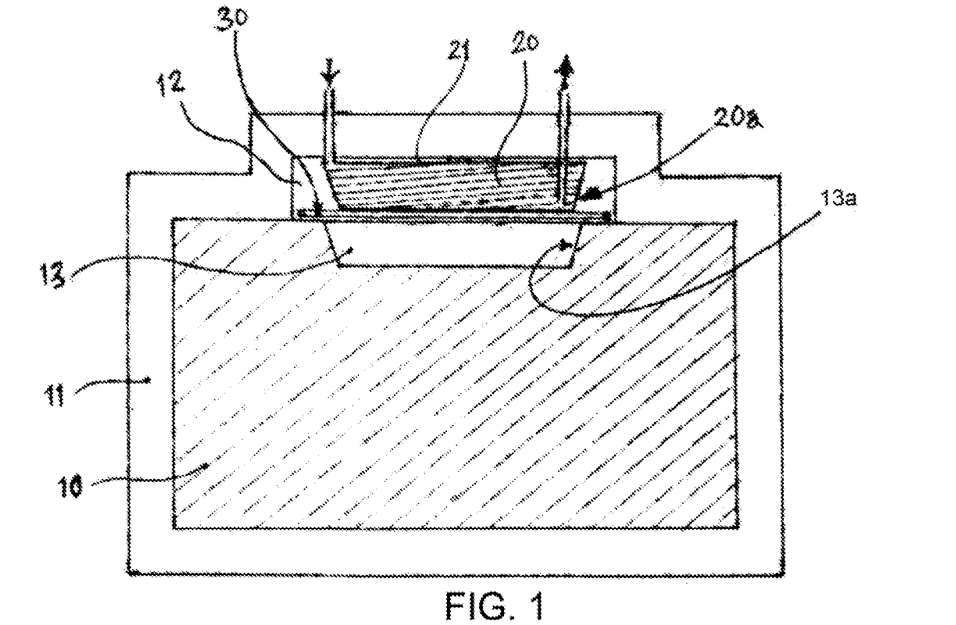
FIG. 1 is a schematic transverse sectional diagram of a first preferred embodiment of the heat storing and transfer system of the present invention comprising of a primary heat storing body and a secondary body having an integral conduit for fluid. The secondary body shown is raised over a recess in the top of the heat storing body that is closed by a thermal barrier iris.
Figure 2:
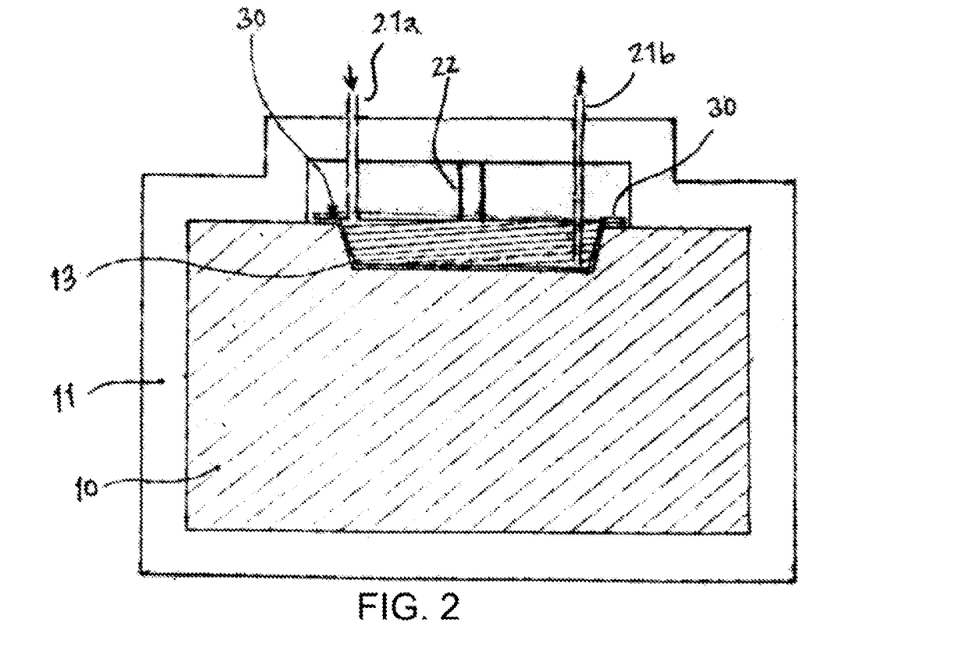
FIG. 2 is a further sectional diagram corresponding to FIG. 1, but showing the thermal barrier iris retracted open and the plug-shaped secondary body moved down into the open recess of the primary heat storing body.
Figure 3:
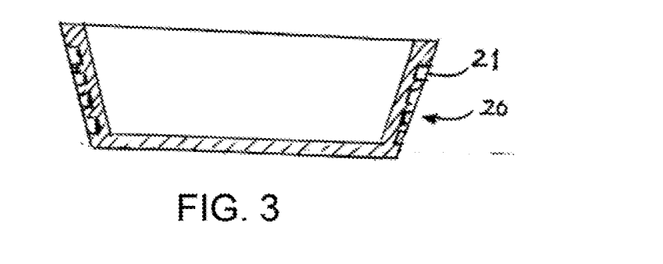
FIG. 3 is a more detailed view of the plug-shaped secondary body showing in more detail the integral conduit that spirals around the body.

Referring firstly to FIGS. 1 to 3 that show a first preferred embodiment of the heat storing and transfer system, which may also be referred to herein as Thermal Energy Storing System (or TESS for short). This system has at its heart a primary heat storing body 10 that is a large mass of cast iron and concrete composite of high thermal density and high thermal conductivity. Alternatively, it may be of other materials with a high thermal density and conductivity. A number of highly thermally conductive rods, e.g. rebar of copper, are suitably arranged within the heat storing body 10 extending through it to enhance heat distribution through the body 10 from the main designated area of heat entry and exit to and from the system The mass of the heat storing body 10 is encased in a housing or casing 11 of thick thermally insulating tiles, bricks or quilt to prevent any heat loss from the heat storing body 10. The secondary body is adjacent and external to the heat storing body 10 held within an extension space or pocket 12 at the top of the housing/casing 11. It has an integral fluid conduit 21 wrapping around its exterior.

The illustrated secondary body 20 is a generally frusto-conical, substantially plug-shaped body. This secondary body 20 is encircled by the integral conduit 21, which (as can best be seen from FIG. 3) is formed as an enclosed channel that coils/spirals around the lateral outer wall/conic outer surface 20a of the secondary body 20 from top to bottom with the outer wall of the conduit 21 being flush with the conic outer surface 20a of the secondary body 20. This conduit 21 carries the fluid, normally water and/or steam, that is to be heated by heat transferred from the heat storing body 10, or from which heat is to be transferred into the heat storing body 10 for storage. A sliding or flexible inflow pipe delivers fluid into the conduit 21 and a corresponding sliding or flexible outflow pipe takes the fluid from the conduit 21.

The overall frusto-conical plug-shaped form of the secondary body 20 conforms closely to the shape and dimensions of the interior of a mating frusto-conical recess 13 that is formed at the top of the primary heat storing body 10. The secondary body 20 is held in the pocket 12 and supported above the recess 13 by a piston 22 as seen in FIG. 1. From that position the piston 22 may be selectively powered to drive the secondary body 20 down into the recess 13. When the piston 22 is at its fullest operative extent, as shown in FIG. 2, the secondary body 20 is fully received in the recess 13 and its conic lateral outer surface 20a is in intimate contact with the corresponding conic inner surface 13a of the recess of the primary heat storage body 10 enabling efficient heat transfer between them. The surface of the cavity/recess 13a particularly preferably incorporates a highly thermally conductive coating and/or a heat transfer fluid is provided in the cavity/recess 13a forming a thin layer on the surface to increase thermal conduction.

While the piston 22 remains retracted and the secondary body 20 remains housed in the pocket/extension space 12 of casing 11, which is raised above the recess 13, there is practically no heat transfer between the conduit 21 of the secondary body 20 and the primary heat storage body 10. This is in part due to the distance and a vacuum gap separating the two since the pocket/extension space 12 of casing 11 and the recess 13 together define a vacuum chamber. This prevention of heat transfer is also due to the presence of a retractable thermal barrier 30 that is mounted over the recess 13 and which caps off/closes off the recess 13 and prevents radiant and other heat losses from the primary heat storage body 10 in the region of the recess 13.

The thermal barrier 30 is suitably in the form of an iris structure, similar to a camera shutter, and provides a complete shield with no opening when fully contracted, but is able to dilate wide to provide a wide aperture giving unfettered access into the recess 13. Alternatively, the thermal barrier may be in two halves and slides laterally across into position.

The opening of the thermal barrier iris 30 is controlled to be substantially synchronized with the downward movement of the piston 22 so that the thermal barrier iris 30 is fully open for the secondary body 20 to be driven into the recess 13 of the primary heat storage body 10 thereby allowing maximal thermal transfer.

In use the fluid to be heated is generally water or steam or a heat transfer fluid and may be pre-heated prior to entering the conduit 21 at inlet 21a that penetrates the wall of the outer casing 11, which houses and insulates the primary heat storage body 10. After entering the conduit 21 the fluid is passed repeatedly around the frusto-conic lateral external surface 20a of the secondary body 20 as the fluid flows down the coiled conduit 21 before passing back out of the conduit, out of the casing 11 through outlet 21b. With the iris thermal barrier 30 contracted, the piston 22 extended and the secondary body 20 moved down from the pocket 12 through the aperture of the open barrier into the recess 13a, the conduit 21 is in an intimate thermal transfer relationship with the conic surface 13a of the recess 13 in the primary heat storing body 10. The water within the conduit 21 efficiently receives stored heat from the heat storing body 10 and at the outlet 21b the water is elevated to a target design temperature.

Figure 4:
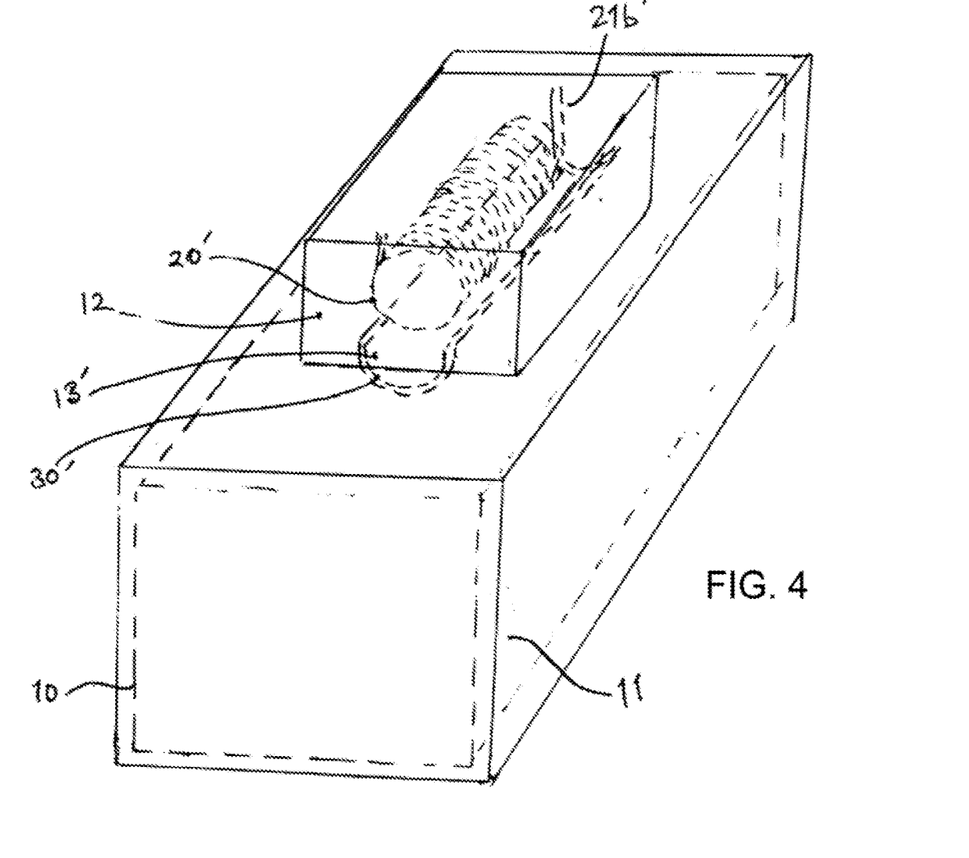
FIG. 4 is a schematic orthogonal diagram of an embodiment of the heat storing and transfer system wherein the secondary body is an elongate cylinder and the recess in the top of the heat storing body is closed/covered by a revolving arcuate thermal barrier.

In the embodiment of the system that is illustrated in FIG. 4, the secondary body 20 is an elongate circular cylindrical form and is mounted within the outer casing 11 with its long axis parallel to the primary heat storing body 10. The recess 13 in the primary heat storing body 10 in FIG. 4 is of corresponding elongated shape. The elongate secondary body 20 is lowered into the recess 13 by a piston 22 or other drive that is perpendicular to the long axis of the secondary body 20.

Figures 5, 6:
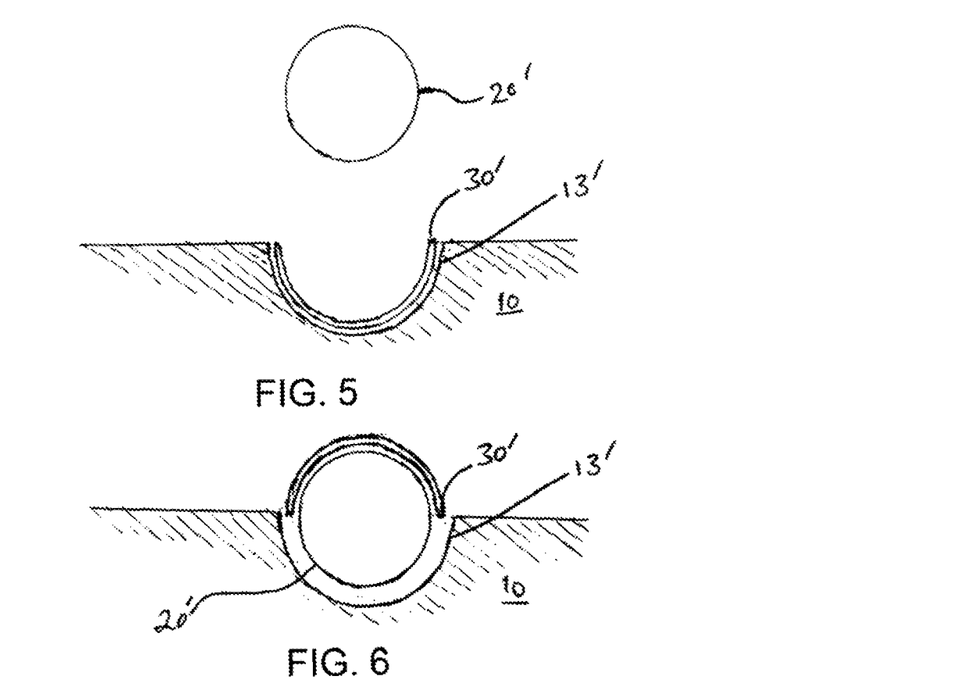
FIG. 5 is a sectional diagram of the secondary body and the recess of the FIG. 4 embodiment as taken along the line V-V with the revolving arcuate thermal barrier blocking heat transfer from the recess of the heat storing body.
FIG. 6 is a sectional diagram of the secondary body corresponding to FIG. 5 once the revolving arcuate thermal barrier has been revolved to expose the secondary body to the heat from the recess of the heat storing body.

In the FIG. 4 embodiment the thermal barrier 30 has a form that corresponds to the secondary body 20. It ensheathes a 180 degrees arc of the external cylindrical surface of the secondary body 20. The arcuate thermal barrier 30 is driven to revolve about its long axis to roll down into place shielding the recess 13 and blocking heat transfer to the secondary body 20 (the heat barrier state as shown in FIGS. 4 and 5). When the barrier rolls away, it exposes the surface of the recess 13 to the secondary body 20 (the heat transfer state as shown in FIG. 6). The thermal barrier 30 may be a single arcuate member as illustrated or it might be formed of two elongate segments that part and revolve in opposing directions to each other about a common axis to expose the recess 13. In a yet further embodiment, the thermal barrier 30 may comprise of a substantially flat sheet that slides across the outer face of the body 10 to expose the recess 13. Again, this might be a single unitary sheet or a pair of sheets that meet over the recess 13. As a further variation or refinement, the thermal barrier 30 may be a barrier that collapses and extends in the manner of a concertina or that furls and unfurls to cover the recess 13.

The motion of the secondary body 20 into the recess 13 is suitably timed to follow or be synchronised with the moving back of the thermal barrier. The drive for the motion of the thermal barrier 30 and the drive for the motion of the secondary body 20 may suitably be common or coupled together or energised by a controller to occur at the required timings.

The system as described above is highly efficient and compact. It may be used simply for domestic energy storage or it may be used on a large industrial scale to store thermal energy. The thermal energy can come from prior generation of electrical energy or from other energy sources, whether from renewable energy sources or otherwise, and it can be released when required to heat water or other liquid flowing through the conduit. The heated water can be heated up to boiling to produce steam or higher to produce superheated steam that will then power an electricity producing turbine, thereby converting the thermal energy to/back to electrical energy.

Figure 7:
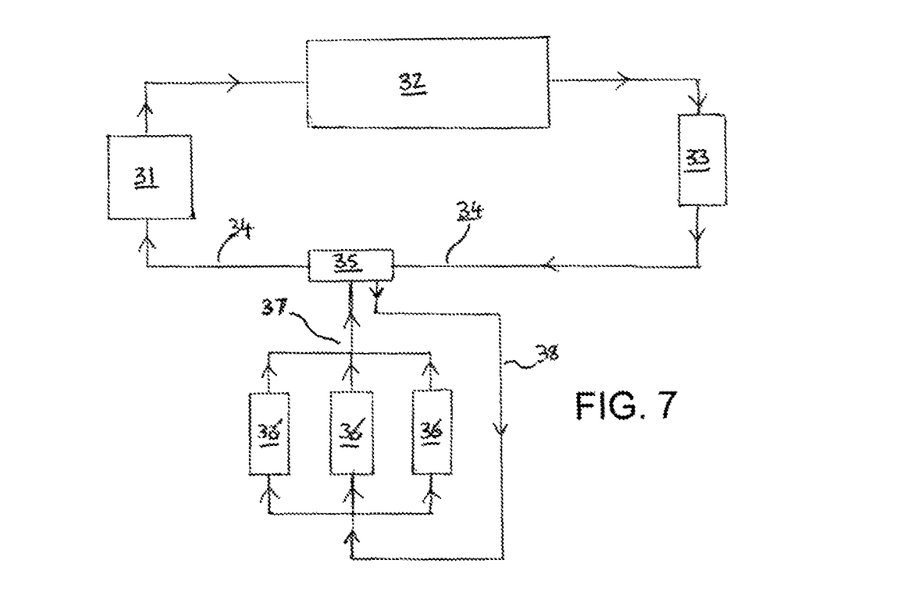
FIG. 7 is a schematic block diagram of the heat storing and transfer system in use as a power station feed-water pre-heater, the heat storing and transfer system being configured as a plurality of repeat units that are connected in parallel with each other to collectively boost the heat supply and being coupled into the power station feed water line by a heat exchanger to heat the water in the feed water line.
Figure 8:
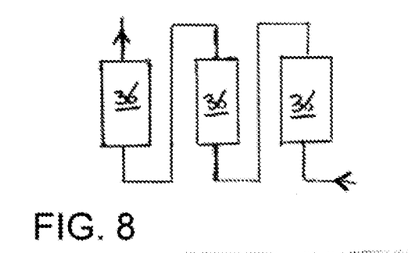
FIG. 8 is a block diagram of the heat storing and transfer system units in a variant configuration, connected end-to-end in series with each other to progressively boost the heat supply.
Figure 9:
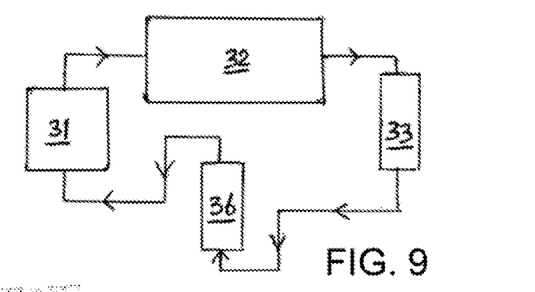
FIG. 9 is a block diagram of the heat storing and transfer system units in series and direct-coupled/installed into the power station feed water line.

Referring to FIGS. 7 to 9, in a particularly preferred embodiment and application of the system, the system may be used on a large industrial scale, preferably to store and release thermal energy as a feed-water pre-heater for power stations. The thermal energy storage system |(TESS) is suitably installed in a conventional coal or bio-mass power station directly or indirectly coupled to pre-heat the feed-water of the power station before it goes into the boiler 31 and then to the power station's turbine 32.

The thermal energy storage system may be provided as a single unit or more preferably for high duty requirements as a bank of a plurality of TESS units 36 in series or parallel with each other.

As shown in FIG. 7, the TESS units 36 are indirectly coupled to the feed-water pipe/line 34 of the power station upstream of the power station's boiler 31 (and suitably downstream of the power station's condenser 33) by a heat exchanger 35 to pre-heat the feedwater in the feed-water pipe/line 34. In the FIG. 7 illustration three of the TESS units 36 are connected together in parallel with each other as a bank with outputs combined in a manifold 37 to provide combined heat fluid supply through a thermally insulated supply line to the heat exchanger 35 and thence supplies heat to the feed-water pipe/line 34. The heated fluid supplied to the heat exchanger 35 from the TESS units 36 is returned to the bank of TESS units 36 by a thermally insulated return line 38.

Accordingly, in operation of the system, while the secondary body 20 is in its heat transfer operative position inserted in the recess 12 of the primary heat storage body 10, the heat transfer fluid, suitably oil, is flowed through the matrix/conduit 21 with a flow rate/dwell time therethrough to enable the heat transfer fluid to be heated by heat from the primary heat storage body 10 to a desired output temperature level. In the illustrated FIG. 7 embodiment the heat transfer fluid flows through the multiple units 36 and then the hot flow passes through manifold 37 and along a further highly thermally insulated length of pipe to the heat exchanger 35 directly on the feed-water pipe 34 (prior to where the feed-water goes into the boiler 31 and then turbine) to transfer the heat to the feed-water. The cooled heat transfer fluid that exits the heat exchanger 35 is then returned to the inlets 21a on the energy storage matrix/conduits 21 of the units 36 to start the thermal transfer cycle again, with a continuous flow from the TESS units 36 heating the heat exchanger 35.

The Feed-water is typically pre-heated to about 260° C. and commonly it will be a dry steam. The TESS of the present invention may, however, be used to pre-heat the feed water well beyond 260° C. and may potentially be used to heat the feed-water up to at or near full operating temperature (about 600 degrees C.) for running the power station, potentially obviating the need for a fossil fuel boiler in some circumstances.

As shown in FIG. 8, where the system is deployed as multiple TESS units 36 the TESS units 36 may alternatively be configured connected together in series to provide combined heat supply to the feed-water pipe/line 34.

In the variant arrangement shown in FIG. 9 the one or more TESS units 36 are directly installed/coupled into the feed-water pipe 34, not coupled by a heat exchanger, so that the feed-water flows directly through them to be heated, i.e. the feed-water flows from the feedwater pipe 34 directly through the conduits 21 of each unit 36 and then through the remaining length of the feedwater pipe 34 to the boiler 31. For this, if there are multiple TESS units 36 the TESS units 36 may be in series or in parallel with each other.

The one or more TESS units 36 installed at a power station are suitably adapted for large scale power transfer/output (equivalent to of the order of 1 Mwh minimum). The TESS units 36 may be adapted to be able to still use electric resistance heaters to supply heat to heat up the primary heat storage body. Thereby, for example, whenever the wholesale price of electricity drops (usually when offsite renewable generated electricity is in surplus or at night in off-peak hours) cheap electricity can be bought on the wholesale market (and possibly the electricity generated from the power station itself under certain price conditions) and used to heat up the energy storage system and store the energy as heat. The energy acquired may then be stored until the market price rises.

Figure 10:
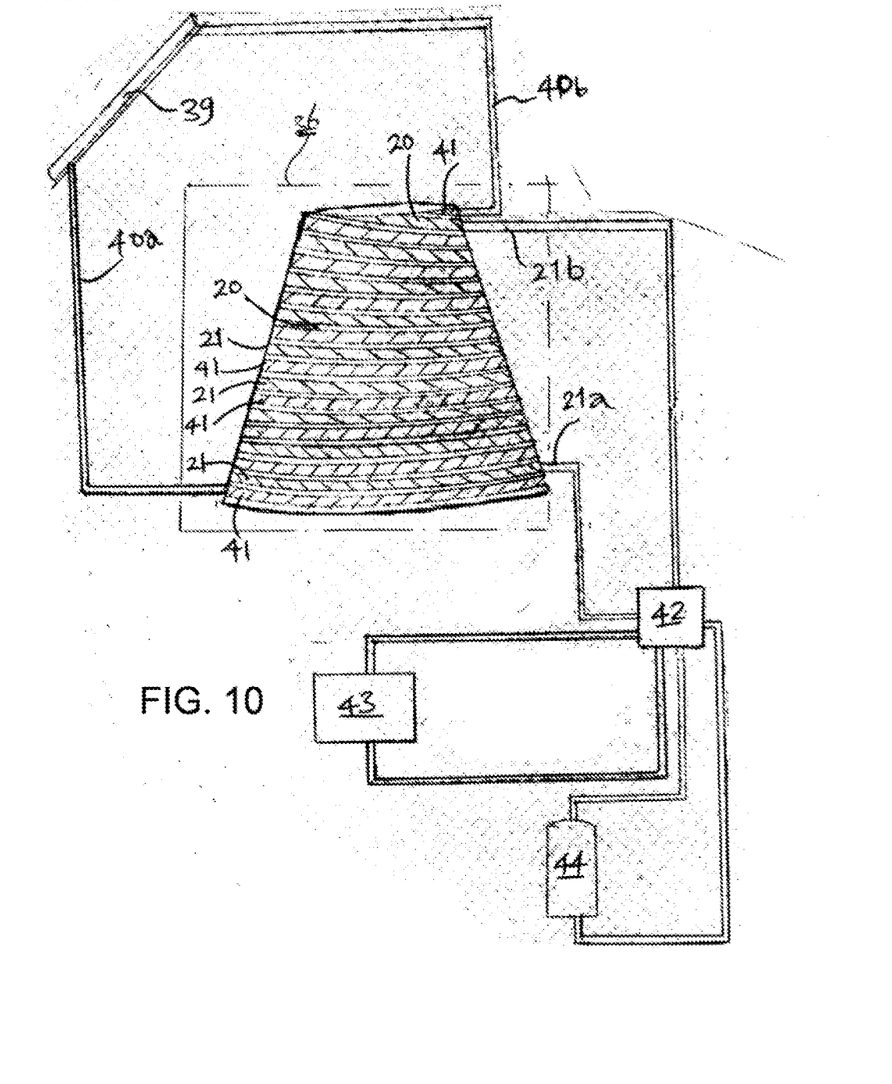
FIG. 10 is a schematic diagram of an embodiment of the heat storing and transfer system suitable for use in a domestic or commercial small-scale application wherein the system incorporates a renewable energy heat source such as a solar thermal array and facilities for using the stored heat energy from the system such as a hot water tank for domestic hot water supply and/or space heating and a micro-turbine electric generator for electricity supply.

Whereas the above-described FIG. 7 embodiment concerns large-scale heat storage for power stations, the heat storing and transfer system/Thermal Energy Storing System (TESS) can be adapted for use in domestic or other small-scale applications, taking thermal energy from available resources/nearby renewable sources and storing the thermal energy for release when required and delivery to one or more facilities such as a hot water tank or to a system for space heating and/or to a device for generating electricity. FIG. 10 shows the TESS unit 36 in a set up suitable for such smaller-scale applications with thermal in-puts from a solar collector/array.

In FIG. 10, the conical (frusto-conical) secondary body 20 of the TESS unit 36 shown carries a double matrix of conduits comprising a first conduit 21 and a second conduit 41 which both are fixed on the core of the secondary body 20, encircling the conical secondary body 20 on its conical surface and suitably also on the circular base of the conical secondary body 20 too. The first conduit 21 and second conduit 41 are preferably formed as channels on the interior of the conical secondary body 20. The conical secondary body 20 may be hollow and filled with a thermally conductive material such as a heat transfer fluid to ensure good thermal conductivity with the matrix channels. The base of the secondary body 20 is suitably configured so that the heat transfer contact area is optimized. In one variant the base may have an undulating finish/profile rather than being totally flat/planar.

The first 21 and second 41 conduits are paired running substantially parallel to each other so that they alternate along the length of the conical secondary body 20 (somewhat like a double helix winding around the conical secondary body 20).

The first conduit/matrix 21 of the double matrix is part of a closed high temperature heat transfer fluid circuit configured to take heat energy out from the TESS unit 36. The closed high temperature heat transfer fluid circuit includes a heat exchanger 42 to transfer the heat from the TESS 36 out to a facility for use of the heat such as hot water cylinder 44 for space heating via radiators or for water heating. A further facility for use of the heat is shown thermally coupled to the heat exchanger 42 in FIG. 10. This suitably is a Micro-turbine electric generator 43 enabling the stored heat of the TESS 36 to be used not only for space heating or water heating but also for generating electricity on a small-scale when required.

The second conduit/matrix 41 of the double matrix is part of a discrete high temperature heat transfer fluid circuit configured to bring heat energy into the TESS unit 36 for storage. One end of the second conduit 41, at an end of the conical secondary body 20, leads into a thermally insulated line/pipe 40a that passes through a solar array 39 for fluid to be heated thereby. At the other end of the second conduit 41 a thermally insulated line/pipe 40b running from the solar array 39 delivers the heated fluid from the solar array into the conduit 41 of the TESS unit 36. The solar array 39 comprises conventional solar thermal evacuated tube collectors that are suitably modified to use a high temperature heat transfer fluid. When exposed to direct sunlight for long enough the collectors and heat transfer fluid flowing through them can heat up to almost 300 C. The heated heat transfer fluid flows into the second matrix/conduit 41 to charge the TESS unit 36 with heat when the secondary body 20 is in the engaged position with the primary heat storage body 10. The TESS unit 36 suitably further has in-built electric heaters as a supplementary source for heating the primary heat storage body 10 when required to boost the temperature of the primary heat storage body 10.

The provision of a double matrix of conduits on the secondary body 20 as shown in FIG. 10 is applicable not only to the smaller scale applications but also to the larger-scale applications of the invention such as for the power station in-feed pre-heater of the previously described embodiments of FIGS. 1 to 9, allowing for discrete energy input and output circuits to the TESS unit 36. One matrix/conduit 41 thus serves for the thermal input to charge the system from a thermal source, which could be in a power station using a heat transfer fluid from the boiler, turbine, condenser or feedwater (anything hot where thermal energy can be captured—particularly when system is ramping down). The other matrix 21 is for the thermal output from the TESS unit 36 to deliver the heat to where it is needed, e.g. the power station feed-water when required.

A double matrix of conduits on the secondary body 20 may also be deployed in other embodiments beyond the first aspect of the present invention. Accordingly, in some applications the secondary body 20 of the TESS unit may be configured to remain static in use (not moving to initiate heat transfer) but suitably with the primary heat storage body or an intermediate heat transfer means moving to enable the heat transfer.

Figure 11:
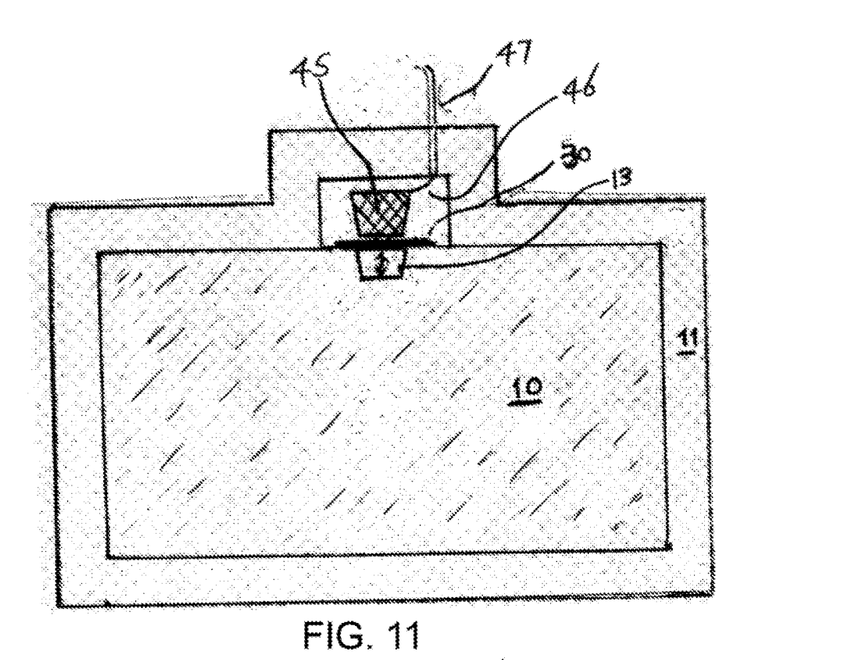
FIG. 11 is a simplified schematic sectional diagram of an embodiment of the heat storing and transfer system adapted to transfer heat from the system to an adjacent thermally-coupled Stirling engine.
Figure 12:
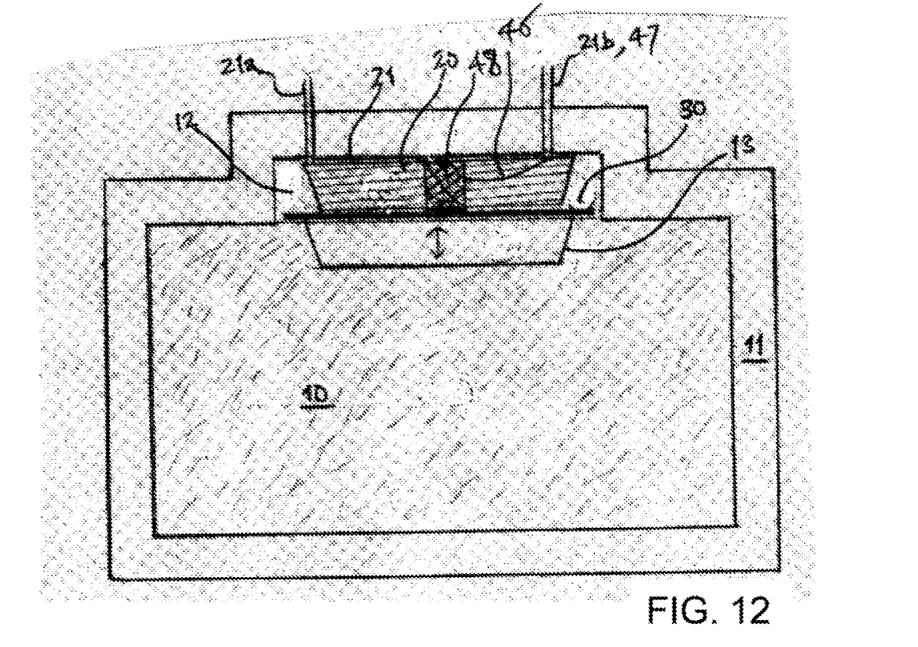
FIG. 12 is a schematic sectional diagram of a variant embodiment of the heat storing and transfer system adapted to transfer heat from the system to an adjacent thermally-coupled Stirling engine, wherein the thermal coupling to the Stirling engine is part of a plug-shaped secondary body with thermal conduit as per any of the preceding embodiments.

Tuning now to FIGS. 11 and 12, these illustrate an embodiment of the invention in which the heat stored in the TESS is output via a Stirling Engine electric generator 45. Corresponding parts have corresponding reference numerals. In common with the preceding embodiments the TESS has a primary heat storage body 10 with a recess 13 into which a secondary body is movable. The mass of the primary heat storing body 10 is within a vacuum chamber or with a vacuum chamber pocket 12 and is encased in a housing or casing 11 of thick thermally insulating ceramic tiles, bricks or quilt to prevent any heat loss from the heat storing body 10. The primary heat storing body 10 again suitably has electric heaters for auxiliary heating. The recess 13 suitably has a thermally conductive coating/liner such as a carbon liner. Thermal transfer between the primary heat storing body 10 and the secondary body 20 is controlled by a movable thermal barrier 30 that selectively allows the secondary body 20 to approach the primary heat storing body 10 in the recess 13.

The Stirling Engine electric generator 45 as shown in FIG. 11 is incorporated within a simplified secondary body that lacks a fluid heat transfer matrix. The eponymous 'hot end' of the Stirling Engine's piston is suitably directly heated by contact with the heated storage medium 10. A flexible electrical connection 46 transfers the generated electrical energy to the output 47 that delivers the electrical energy external to the TESS.

The Stirling Engine electric generator 48 as shown in FIG. 12 is incorporated within a secondary body 20 that has a fluid heat transfer matrix/conduit 21 and which is thus more similar to the FIGS. 1 and 2 embodiments.

The Sterling engine electric generator integrated into the secondary body allows the stored heat to be directly applied to the cylinder thereof when the thermal barrier 30 is retracted and the body makes heat transfer contact/relationship with the primary heat storage body's recess. This will directly heat the gas in the cylinder of the Stirling engine enabling the piston thereof to move and the sterling engine to operate. There can be multiple Sterling engines in a single secondary body 20 or multiple bodies 20 containing single sterling engines. There may also be a matrix/conduit in the body 20, such as shown in FIG. 12 to provide a heat source for other applications to work simultaneously with the Sterling engine.

Figure 13:
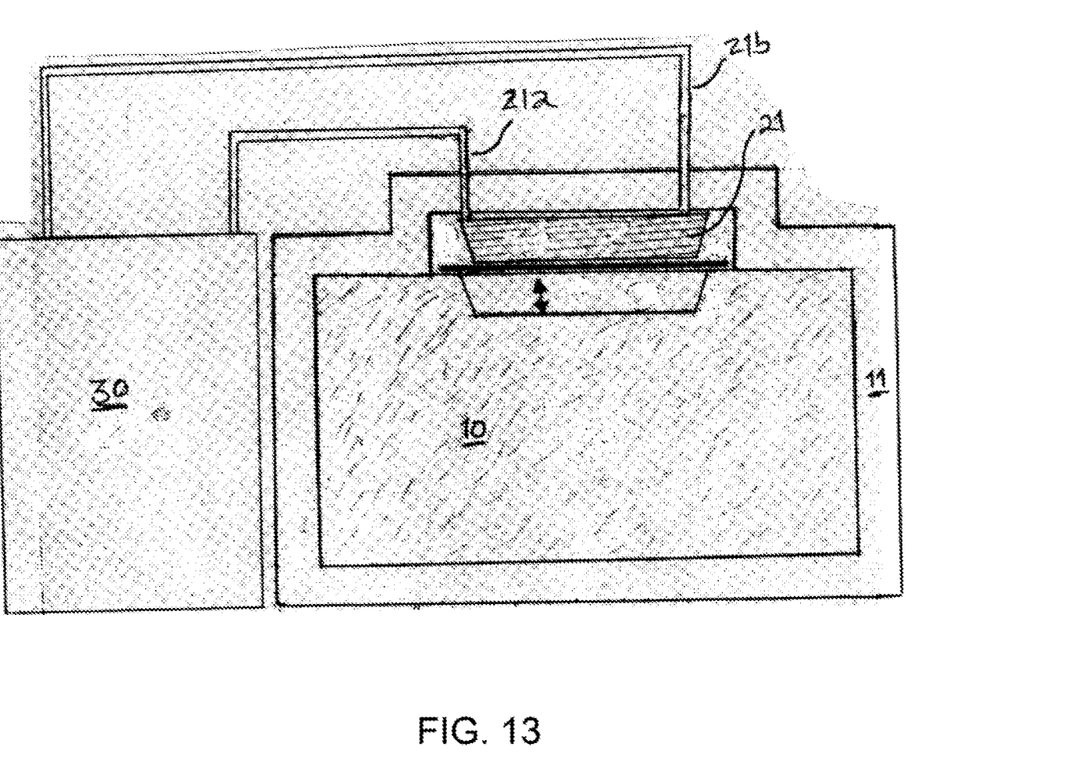
FIG. 13 is a schematic sectional diagram of a variant embodiment of the heat storing and transfer system adapted to transfer heat to an adjacent thermally-coupled absorptive refrigeration unit.

Although the invention as described above in respect of FIGS. 1 to 12 is primarily designed for output of heat for space or water heating and/or output of electrical energy from the TESS, in some embodiments of the invention the output from the TESS may be used for other purposes such as in an absorption Cooling Cycle of a refrigeration system instead. Referring to FIG. 13 the use for an absorption Cooling Cycle of a refrigeration system is schematically illustrated. The inlet and outlet conduits 21*a*, 21*b* from the conduit 21 of the secondary body 20 carry refrigerant (usually ammonia) that is heated by the TESS and circulated through the refrigeration system's cooling circuit 30.

The invention is not limited to the embodiments described above and features of any of the embodiments and aspects of the invention may be employed separately or in combination with features of the same or a different embodiment or aspect and all combinations of features to produce an appliance/system within the scope of the invention.

In a further aspect the present invention may comprise a heat storage and transfer system that comprises: a primary heat storage chamber or body that is thermally insulated and which in use contains or comprises a heat storing liquid or solid; and a secondary chamber external to and adjacent the primary heat storage chamber or body through which a heat transfer fluid/liquid or steam to be heated is passed in use, the system having a heat transfer feature to selectively transfer thermal energy from the heat storing liquid or solid of the primary heating chamber or body to the heat transfer fluid/liquid or steam to be heated in the secondary chamber. Particularly preferably the system has a radiant heat barrier that may be selectively extended as a barrier between the primary heat storage chamber or body and the secondary chamber. The radiant heat barrier may be expandable/extendible and collapsible or movable to be activated and deactivated.

In a further aspect the present invention may comprise a heat storage and transfer system that comprises: a primary heat storage chamber or body that is thermally insulated and which in use contains or comprises a heat storing liquid or solid; and a thermal energy to electrical energy converter in or thermally coupled to at least one of: i) a secondary chamber external to and adjacent the primary heat storage chamber or body through which a liquid or steam to be heated is passed in use; and ii) a thermal conduction plate/surface external to the thermally insulated primary heat storage chamber or body, the system having a heat transfer feature to selectively transfer thermal energy from the heat storing liquid or solid of the primary heating chamber or body to the thermal conduction plate or the liquid or steam to be heated in the secondary chamber for the thermal energy to thence be converted to electrical energy by the thermal energy to electrical energy converter.

In this aspect the primary heat storage chamber is preferably thermally insulated and substantially shielded by a thermal barrier from conductive direct heat transfer relationship with the secondary chamber. The thermal barrier suitably comprises a vacuum gap/chamber. The heat transfer feature for selectively transferring thermal energy from the primary heat chamber to the secondary chamber preferably comprises a heat conductive material thermal shunt. The heat transfer feature comprises a mechanism that moves a surface on the primary heat chamber or body and a surface on the secondary chamber relative to each other to move together substantially contacting each other or apart. The heat transfer feature preferably moves within the vacuum gap/vacuum chamber between the primary heat chamber and the secondary chamber and selectively operates to thermally bypass the thermal barrier defined by the vacuum gap/vacuum chamber. The mechanism preferably comprises a drive piston and/or a worm drive.

Preferably the mechanism moves the primary heat storing chamber or body or a substantial part thereof upwardly and the appliance comprises a spring or counter-balance to reduce the energy required for that. Suitably the primary heat storing body is a solid mass of at least first and second parts or the primary heat storing chamber is of first and second parts, wherein the first part and second part are movable relative to each other by the mechanism. Suitably the first part and second part are configured to substantially counter-balance each other and preferably the first part and second part are configured one with a male surface and the other with a female surface to inter-fit. Preferably the heat transfer feature is automated or controlled by a controller to move between an inoperative state where it does not bridge to the secondary chamber and an operative state where it does bridge to the secondary chamber. The heat conductive material thermal shunt is preferably automated to switch to the inoperative state once the liquid in the secondary chamber has reached the target temperature. Suitably said surface of the primary heat chamber or body and said surface of or thermally coupled to the secondary chamber are mating, preferably conical, surfaces that inter-fit.

Suitably the heating of liquid supplied into the system is carried out in two or more stages, each stage elevating the temperature of the liquid farther and being in successive chambers. The appliance may have a pre-heating chamber for pre-heating the liquid or steam prior to it flowing into the secondary chamber. Preferably the system has a casing housing the primary and secondary chambers and which is insulated. The insulation of the casing and/or thermal barrier where present may comprise a cellular or foam lining and/or there is an air gap or partial vacuum between the casing and the chambers. The secondary chamber may surround the primary heat chamber as an annulus and may fully encapsulate the primary heat chamber. Suitably the secondary chamber is a conduit through which the liquid to be heated is able to flow. The secondary chamber may comprise a pipe or conduit that coils tightly in a spiral around a perimeter of a vacuum space/gap that surrounds the primary heat chamber/body. The secondary chamber is a twin walled sheath that incorporates between the twin walls a matrix of one or more ducts or conduits and that extends around a perimeter of a vacuum space gap that surrounds the primary heat chamber/body. The or each pipe, duct or conduit may spiral both up and down the appliance for additional heat transfer. The secondary chamber may be externally surrounded by a tertiary chamber that carries a liquid to be heated to a lower temperature than the liquid to be heated of the secondary chamber. The tertiary chamber may be part of or coupled into a closed loop space heating system. The appliance suitably has an outer vacuum gap or vacuum chamber ensheathing the secondary chamber or, if present, the tertiary chamber. Preferably the heat storage and transfer system has a processor or controller operatively linked thereto that is programmed to control the appliance. Preferably the processor or controller is programmed with one or more predictive algorithms to predict and thence control the appliance to manage operation of the appliance's use of energy and minimise demand spikes or enable the appliance to be pre-heated or boiled for predicted demand. The processor or controller may be programmed to control the appliance to manage operation of the appliance's use of energy to be pre-heated when surplus electrical energy from renewable sources is available and in doing so reconciles how long it can store the energy and when it predicts the appliance will next need to be used. The processor or controller is preferably programmed to control the appliance to manage operation of the appliance to serve as a store of energy in thermal form and to release the energy in managed amounts and when required. The processor or controller is suitably operatively linked to a sensor that senses the temperature of the primary heat storage chamber or body or surrounding vacuum gap or chamber.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A heat storage and transfer system comprising:
   a) a primary heat storage chamber or body that is thermally insulated and which in use contains or comprises a heat storing liquid or solid; and
   b) a secondary chamber external to and adjacent the primary heat storage chamber or body through which a liquid or steam to be heated is passed in use,
   c) a heat transfer mechanism to selectively transfer thermal energy from the heat storing liquid or solid of the primary heating chamber or body to the liquid or steam to be heated in the secondary chamber, wherein the mechanism comprises a drive that moves the secondary chamber from a first position, thermally separated/spaced from the primary chamber or body, into a second position that is substantially inserted in a void or recess within the primary chamber or body;
   d) a movable thermal barrier that is selectively positioned between the secondary chamber and the primary chamber or body to guard against heat transfer there-between.

2. The heat storage and transfer system as claimed in claim 1, wherein the recess or void is in an external surface of the primary chamber or body, contains the primary chamber or body that at least partly surrounds the secondary chamber when the secondary chamber is in position for thermal transfer.

3. The heat storage and transfer system as claimed in claim 1, wherein the primary chamber or body is a substantially solid body.

4. The heat storage and transfer system as claimed in claim 1, wherein the primary chamber or body is a mass of concrete composite, silicon and/or iron.

5. The heat storage and transfer system as claimed in claim 1, wherein the recess or void is in a top external surface of the primary chamber or body and the secondary chamber is above the primary chamber or body and arranged to be lowered down into the primary chamber or body.

6. The heat storage and transfer system as claimed in claim 1, wherein the recess or void is of a complementary shape to a corresponding external surface of the secondary chamber whereby there is a mating inter-fit of the secondary chamber in the primary chamber or body.

7. The heat storage and transfer system as claimed in claim 1, wherein the secondary chamber has a convex curved outer surface and the recess or space has a concave surface that accommodates the convex curved outer surface.

8. The heat storage and transfer system as claimed in claim 1, wherein the secondary chamber is an elongate conduit that comprises of a coil or matrix of tubing.

9. The heat storage and transfer system as claimed in claim 1, wherein the secondary chamber is defined in a lateral outer surface of a secondary body and the secondary body is of a substantially cylindrical, conical or frusto-conical overall form.

10. The heat storage and transfer system as claimed in claim 9, wherein the secondary body is substantially hollow at its core.

11. The heat storage and transfer system as claimed in claim 9, wherein the secondary body has an elongate form selected from the group consisting of: an elongate cylindrical form, conical form, and frusto-conical form having a long axis and suitably the recess is a complementary-shaped elongate trough/groove in the primary chamber or body and the long axis of the secondary body form is substantially parallel or oblique to the recess in use.

12. The heat storage and transfer system as claimed in claim 9, wherein the secondary body is of a short, substantially cylindrical or frusta-conical overall form, and the recess is a complementary-shaped recess in the primary chamber or body and whereby an axis of the short substantially cylindrical form of secondary body is substantially orthogonal to the primary chamber or body.

13. The heat storage and transfer system as claimed in claim 1, wherein the secondary chamber is an elongate circular cylindrical tubing coil the long axis of which is substantially parallel or oblique to the recess.

14. A heat storage and transfer system comprising:
a) a primary heat storage chamber or body that is thermally insulated and which in use contains or comprises a heat storing liquid or solid; and
b) a secondary chamber external to and adjacent the primary heat storage chamber or body through which a liquid or steam to be heated is passed in use,
c) a heat transfer mechanism to selectively transfer thermal energy from the heat storing liquid or solid of the primary heating chamber or body to the liquid or steam to be heated in the secondary chamber, wherein the mechanism comprises a drive that moves the secondary chamber from a first position, thermally separated/spaced from the primary chamber or body, into a second position that is substantially inserted in a void or recess within the primary chamber or body;
wherein the secondary chamber is defined in a lateral outer surface of a secondary body and the secondary body is of a substantially cylindrical, conical or frusto-conical overall form; and
wherein the secondary body is positioned within a thermal insulating cover that also houses and thermally insulates the primary chamber or body and provides thermal insulation to both bodies.

15. The heat storage and transfer system as claimed in claim 14, wherein the secondary chamber/body is positioned in a pocket within the thermal insulating cover.

16. The heat storage and transfer system as claimed in claim 14, wherein the thermal insulating cover of the primary chamber or body comprises of cladding of ceramic tiles, bricks or quilt.

17. A heat storage and transfer system comprising:
a) a primary heat storage chamber or body that is thermally insulated and which in use contains or comprises a heat storing liquid or solid; and
b) a secondary chamber external to and adjacent the primary heat storage chamber or body through which a liquid or steam to be heated is passed in use,
c) a heat transfer mechanism to selectively transfer thermal energy from the heat storing liquid or solid of the primary heating chamber or body to the liquid or steam to be heated in the secondary chamber, wherein the mechanism comprises a drive that moves the secondary chamber from a first position, thermally separated/spaced from the primary chamber or body, into a second position that is substantially inserted in a void or recess within the primary chamber or body;
wherein the system comprises a movable thermal barrier that is selectively positioned between the secondary chamber and the primary chamber or body to guard against heat transfer there-between; and
wherein the thermal barrier overlies the recess or void of the primary body while the secondary chamber is in the first position, and wherein the drive is configured to move the secondary chamber/body to its second position within the recess or void.

18. The heat storage and transfer system as claimed in claim 17, wherein the thermal barrier comprises of an iris that dilates or a plate or a cover that slides laterally aside or revolves away from covering the recess or void to allow the secondary chamber to advance into the recess or void.

* * * * *